United States Patent [19]

Tollefsen

[11] Patent Number: 5,477,921
[45] Date of Patent: Dec. 26, 1995

[54] METHOD AND SYSTEM FOR LOGGING A WELL WHILE FISHING FOR THE LOGGING TOOL

[75] Inventor: Edward M. Tollefsen, Gretna, La.

[73] Assignee: Schlumberger Technology Corporation, Houston, Tex.

[21] Appl. No.: 277,461

[22] Filed: Jul. 19, 1994

[51] Int. Cl.[6] ............................. E21B 23/00; E21B 31/00; E21B 29/04; E21B 47/00
[52] U.S. Cl. .................................... 166/250.13; 166/65.1; 166/277; 166/301; 166/385
[58] Field of Search .................................. 166/65.1, 301, 166/99, 277, 250, 385

[56] References Cited

U.S. PATENT DOCUMENTS

| | | | |
|---|---|---|---|
| 4,105,070 | 8/1978 | Lavigne et al. | 166/301 X |
| 4,678,038 | 7/1987 | Rankin | 166/301 |
| 4,690,214 | 9/1987 | Wittrisch | 166/65.1 X |
| 4,725,783 | 2/1988 | Miyairi et al. | 166/65.1 X |
| 5,370,545 | 12/1994 | Laurent | 166/65.1 X |

*Primary Examiner*—Stephen J. Novosad
*Attorney, Agent, or Firm*—Henry N. Garrana; Darcell Walker

[57] ABSTRACT

This invention provides a method and system for logging an earth formation with a logging tool that is stuck (lodged) in a well bore traversing the earth formation while fishing for the stuck logging tool. This procedure is accomplished by re-establishing communication between the stuck logging tool and surface equipment during the fishing process. Communication is established by reconnecting the electrical conductors in the supporting cable after the cable has been severed in order to install fishing equipment in the well bore around the cable supporting the logging tool. The procedure to reconnect the electrical conductors requires identifying conductors in each end of the severed cable and appropriately matching conductors from each cable end to achieve electrical communication. Once there is electrical communication between the stuck logging tool and surface logging equipment, logging procedures can be continued even during the fishing for the stuck logging tool.

19 Claims, 4 Drawing Sheets

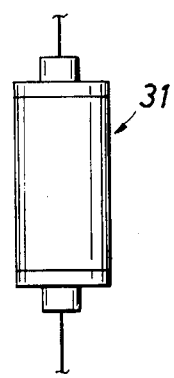
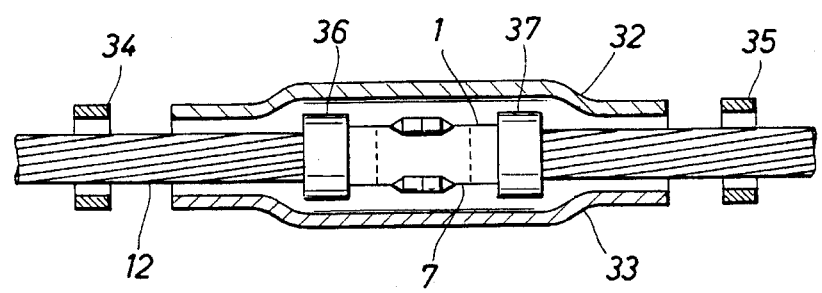
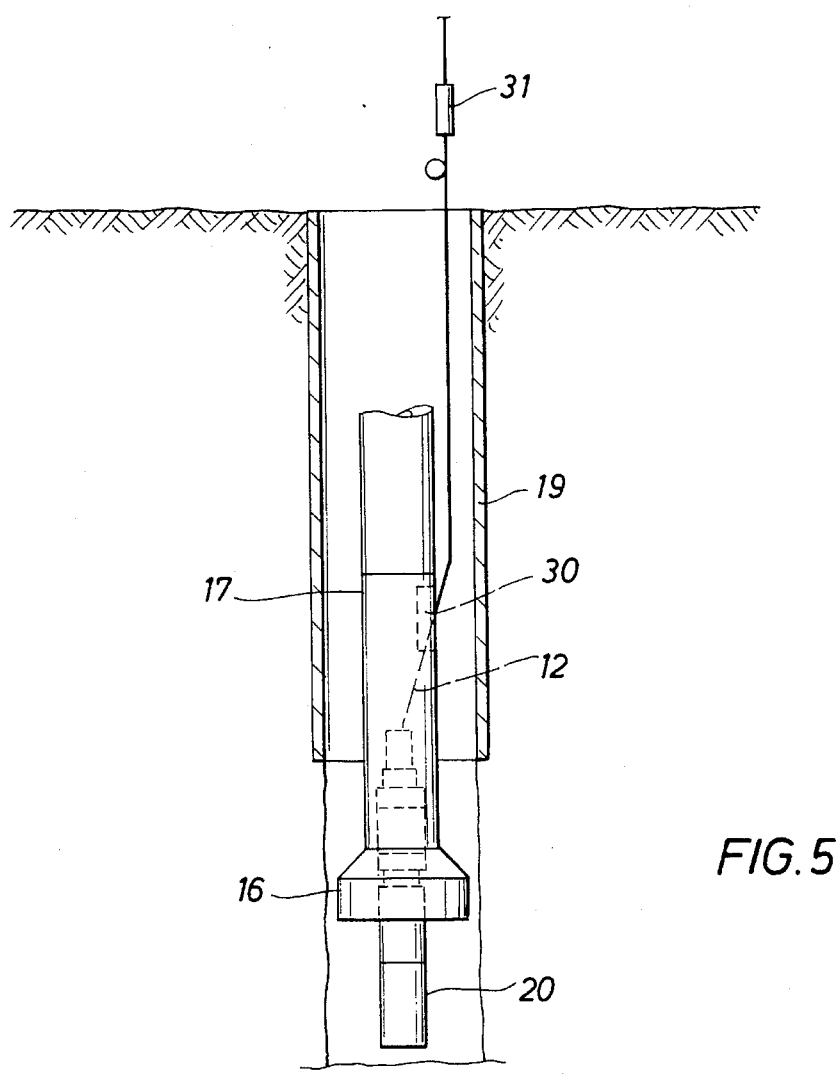

METHOD AND SYSTEM FOR LOGGING A WELL WHILE FISHING FOR THE LOGGING TOOL

FIELD OF THE INVENTION

This invention refers to an improved and more efficient method and system for retrieving (fishing) objects from a well bore. In particular, it refers to a method and system of continuing the well logging operation with a logging tool that is stuck in a well bore while the logging tool or cable is being dislodged and retrieved (fished) from a well bore.

BACKGROUND OF THE INVENTION

During well logging operations, logging tools are lowered through a well bore into an earth formation. Logging tools are suspended in the well bore by cables. These tools detect and measure phenomena that are reflective of formation characteristics while the tool is raised and lowered in the well bore.

Unfortunately, during these logging operations, it is not unusual for a logging tool or even the cable to become stuck in the well bore. Various factors, such as well bore deviation, contribute to tools and cables becoming stuck or lodged in the well bore. When it becomes necessary to remove various objects (fish), such as a segment of drill pipe or a subsurface tool from a well bore, a procedure known as "fishing" is implemented. During a wireline fishing operation, a device known as an overshot ( a device that engages the top of a logging tool by use of a grapple and retains the tool) is lowered down the well bore to the location of the stuck tool. Once the overshot engages the stuck tool and dislodges the tool or frees the cable, surface retrieval equipment pulls the overshot and the logging tool to the surface where the tool is retrieved. The following description of the fishing procedures assumes the reader has the basic knowledge of techniques and procedures involved in fishing for well logging equipment.

The typical equipment and steps involved in a wireline fishing operation are described in FIGS. 1A–1D. When fishing for a stuck tool, the engaging overshot 16 that will engage the tool is lowered into the well bore 13. In order to lower an engaging overshot into the well bore, the cable 12 supporting the stuck logging tool must be severed to thread the cable through drill pipe 17. Threading is the process of pulling the cable through the center of drill pipe as the engaging overshot is lowered into the well bore. As shown in FIG. 1A, a supporting T-Bar 11 is attached to the cable 12 to secure the cable and prevent it from being pulled into the well bore 13 by the weight of the portion of the cable suspended in the well bore. After attaching the T-Bar to support the cable, the cable is severed at the surface. However, by severing the cable, mechanical and electrical contact between surface logging equipment and the logging tool downhole ceases.

FIG. 1B shows the conventional reconnection procedure that is performed to re-establish the mechanical connection between the tool and surface logging equipment (reconnect the severed cable). This cable reconnection step incorporates a spear 14 attached to one end of the severed cable and another cable overshot 15 attached other end of the severed cable. The spear slides into the overshot socket to form a union and re-establish the mechanical connection of the cable. To insure reliability of this union, stress tests are performed on the union. (Note in a fishing procedure there is no re-establishment of the electrical communication between downhole and surface equipment).

The next step in the convention fishing procedure is to pass the engaging overshot 16 over the cable 12 and thread as shown in FIG. 1C. During the attachment of both the engaging overshot and first stand of drill pipe 17, the spear 14 and cable overshot 15 are disconnected to allow for passing through of the cable through each piece of equipment. Field personnel who perform fishing operations are aware that the cable is attached to the tool in the well bore at one end and to surface equipment at the other cable end. Therefore the easiest way to install the fishing equipment is to sever the cable. Consequently, during this process each time a piece of equipment or drill pipe is installed, the cable is disconnected, threaded through the drill pipe, and reconnected, using the spear 14 and overshot 15 (these devices are also known as latches).

Each time a stand of pipe is attached, the engaging overshot is raised to the top of the drill pipe stands and then lowered through each additional stand of pipe. The depth of the stuck tool determines how many stands of drill pipe are connected to the engaging overshot to enable the overshot to engage the stuck equipment.

FIG. 1D shows the fishing equipment installed in the well bore. In the figure, a logging tool 20 is shown in an open well bore. The casing 19 inside the well bore may or may not extend to the depth of the tool. The engaging overshot 16 is lowered into the well bore by extensions of drill pipe 17. The spear 14 and cable overshot 15 shown as 18 provide a mechanical connection and support for the cable. A spear and C-plate (not shown) provide support for the cable during the attachment of additional stands of pipe, which require the disconnecting of the spear and overshot.

In FIG. 1D, the engaging overshot 16 contacts the stuck tool 20 and dislodges the tool or frees the wireline (cable). Once the overshot engages the tool 20, the entire assembly (logging tool, engaging sub and drill pipe) can be raised to the surface. Although, the present methods are successful in retrieving stuck equipment, there are many concerns associated with the present method. One major concern is the time required to retrieve a piece of equipment from the well bore. It is not unusual to take up to 39 hours or about a day of rig time to retrieve a stuck tool and another day to prepare the well for additional logging.

During current tool fishing procedures, the support cable is severed at the surface to enable work crews to pass the fishing equipment over the cable. This equipment will be lowered into the well bore via a drill pipe 17. Fishing equipment is attached to both ends of the severed cable. Work crews then re-attach the severed cable. However, the re-attachment is only for mechanical purpose. In current fishing procedures, there is no re-establishment of the electrical communication in the cable. Because there is no re-establishment of the electrical connections, no further logging can occur while retrieving the tool from the well bore. In addition, work crews do not have the option of continuing the logging run if it is desired once the tool has been dislodged from the well bore. This situation increases the length of time required to do a job and increases the overall cost of the job. The cost is increased in several ways: 1) increased length of time the logging crew is occupied with this job; 2) rig and support time continue to mount (not uncommon to be as much as $4000/hour); 3) cost of doing the fishing procedure; and 4) in a production well increased logging time means loss of valuable production time.

Therefore a method and system of retrieving equipment stuck in a well bore are needed that can provide more efficient use of the retrieval time and the fishing equipment.

SUMMARY OF THE INVENTION

An object of this invention is to log an earth formation with a logging tool that is stuck in a well bore while fishing the logging tool from the well bore.

Another object of this invention is to re-establish electrical communication between surface equipment and the stuck logging tool after the cable that supports the logging tool is severed during the fishing process.

This invention enhances current fishing procedures by enabling work crews to continue the logging procedures after dislodging a previously stuck logging tool and while raising the logging tool to the surface. During well logging procedures, the logging tool is supported and suspended in the well bore by a logging cable. This cable not only provides the physical (mechanical) connection between the tool and surface logging equipment, but this cable also establishes the means of electrical communication between the tool and surface recording equipment. The electrical communication enables the transmission of logging data and tool power from the logging tool to surface logging equipment.

The present invention provides a method and system for logging while fishing by re-establishing contact of the electrical conductors after the cable has been severed during the fishing procedures. After the installation of an engaging overshot that will dislodge the stuck tool and a predetermined amount of drill pipe, the electrical connections in the cable are re-established. The procedure to re-establish the electrical conductors initially involves identifying the various conductors (such as conductors one through seven of a standard cable) on the up hole portion of the cable using identification methods such as attaching each line to ground and identifying them with an ohmmeter. Identification of the down hole end cable conductors first requires the crew to identify lines 1 and 4. This identification will be possible on digital tools by using a ohmmeter and looking for resistance across the power transformer in the downhole tool by the equation:

2 ohms/100 feet*the total down cable length across opposite wires Lines 2 to 5 and 3 to 6 will show 2 ohms/100 feet*the total downhole cable length. To verify that the selection is correct, compare lines 2, 3, 5 or 6 to the selected lines 1 or 4. If the selection is correct, there should be infinite resistance. This result is possible because the two transformers used for 2 to 5 and 3 to 6 are not isolated from each other. After the electrical connections are re-established, power is restored to the tool and the tool again has logging capability.

The next step is to engage the stuck tool with the engaging overshot as is done in conventional fishing. However, afar the engaging overshot dislodges the tool, regular logging can continue while the tool is being lifted (raised) to the surface or while the tool is lowered in the well bore during the continuation of the logging process.

BRIEF DESCRIPTION OF THE DRAWINGS

FIG. 4A illustrates a torpedo used to house the reconnected electronic conductors in the cable;

FIG. 4B a cross-section view of the torpedo housing the reconnected conductors in the cable; and FIG. 5 is an illustration of the preferred embodiment in which the engaging sub engages and dislodges the stuck logging tool.

DESCRIPTION OF THE PREFERRED EMBODIMENT

The present invention is a hybrid of Cut and Thread Fishing (CTF) techniques and Tough Logging Conditions (TLC) procedures. The Applicant assumes that the reader has knowledge of cut and thread fishing and TLC procedures. For this invention, it is also necessary to know the wiring configurations and responses of various logging tools. This knowledge of tool wiring is obviously necessary when attempting to re-establish electrical communication between the logging and surface recording equipment.

When using the present invention, the cite engineer must consider the casing depth in the wellbore and the remaining interval of the wellbore beyond the casing that the engineer desires to log. This information is important because the wireline above the side-door sub 30 (the side opening in the drill pipe that allows the cable to exit the string of drill pipe, thereby permitting stands of pipe to be added to or removed from the drill string without having to sever the cable) should not be lower in the wellbore than the casing.

Figure 2:
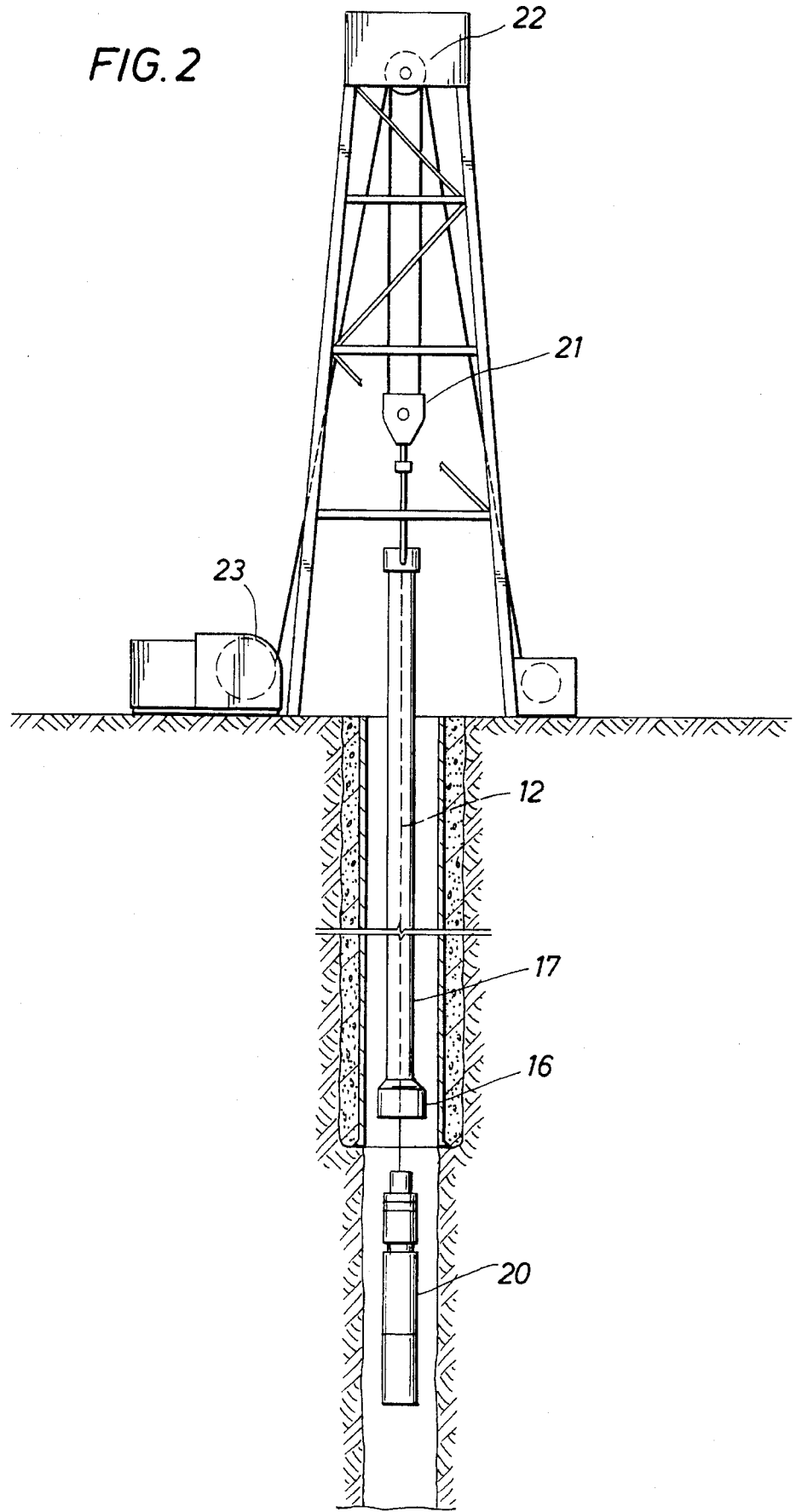
FIG. 2 is a diagram of the retrieval (fishing) and support system which is attached to the fishing equipment and assists in fishing for the logging tool.

As previously mentioned, this invention begins in a fashion similar to conventional fishing procedures. The preferred embodiment incorporates the use of a conventional full Cut and Thread Fishing kit and double ended torpedo. However, unlike current methods of fishing, this invention also incorporates a new modified side-door sub 30. As shown in FIG. 2, the fishing equipment is supported by a suspension system at the surface. In the suspension system, a traveling block 21 supports drilling and fishing equipment. The 30 inch sheave wheel (which is used to support the cable) is generally moved to the crown block 22. A hoisting drum 23 contains the cable used to raise and lower the load attached to the traveling block.

Figure 1A:
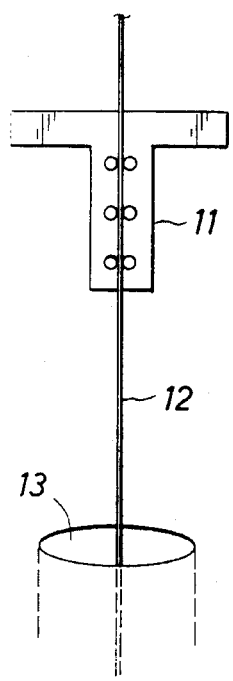
FIG. 1A illustrates the T-Bar (also known as a cable clamp) used to support the logging tool and weight of the wireline suspended in the well bore after the cable is initially severed.
Figure 1B:
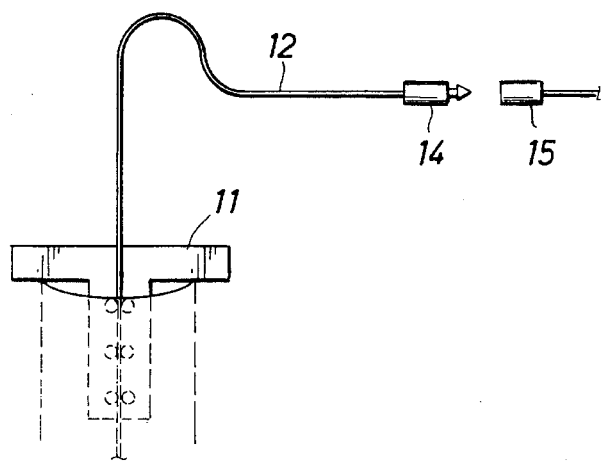
FIG. 1B illustrates the spear and overshot used to mechanically reconnect the severed logging cable.
Figure 1C:
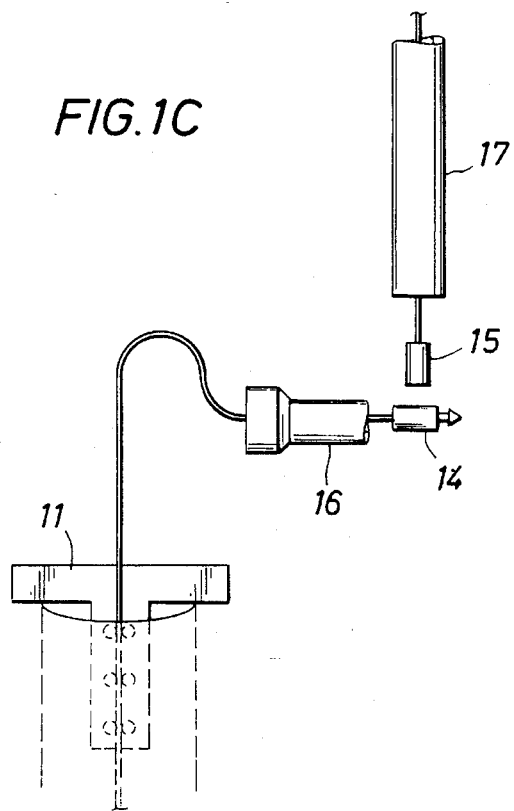
FIG. 1C illustrates the engaging overshot and drill pipe used to engage and dislodge the stuck logging tool.
Figure 1D:
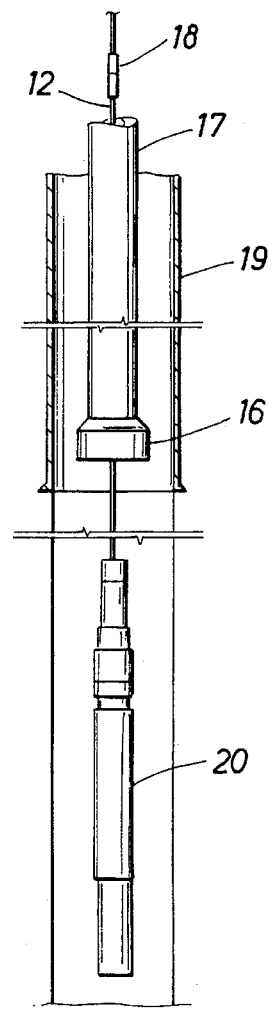
FIG. 1D illustrates the cut and thread system used to fish for a logging tool stuck in a well bore.

The first step in this fishing procedure is to assemble the engaging overshot. The overshot 16 has a flushed end, as shown FIG. 1D, that will fit over the stuck tool when the sub is lowered into the wellbore. The engaging overshot also contains a grapple (a cylindrical device with teeth inside that attaches to any object [the tool] inserted inside it). The flushed end provides flexibility when attempting to engage the stuck logging tool, regardless of tool position in the well bore. A narrower ended overshot would make it more difficult (depending on the tool position) to fit the overshot over the tool and to engage the tool.

After assembling the engaging overshot, the crew prepares to sever the cable 12. This technique requires pulling the cable out of the well bore until the cable reaches a desired tension. The crew usually pulls the cable to approximately 1,500 to 2,000 pounds over the normal tension of the cable.

Because this cable is under extremely high tension, steps are taken to prevent the cable from falling into the well bore after the cable is severed. A T-Bar 11 is clamped to the cable 12 and installed at the well bore head to prevent the severed cable from falling into the well bore. Tension in the cable is slowly transferred to the T-Bar until the T-Bar supports the total weight of the cable in the well bore. This transfer is accomplished by slacking off the cable until weight on the T-Bar is supported by the rig floor. Following installation of the T-Bar, the cable is severed. An extra 5 to 10 feet of cable is allowed as needed for key seating.

After cutting the cable and securing the downhole end at the rotary with a T-Bar, the traveling block supporting the upper sheave is lowered in order to rearrange the sheaves in the derrick. This step is necessary because the traveling block must be used to handle drill pipe.

At this point, it is necessary to reconnect the severed cable. The rope socket provides a place to hang a tool at the end of the cable, however, no electrical connections are made. For this procedure, the invention consists of a rope socket device that is used to attach tools to a cable. A conventional rope socket device is a hollow cylinder containing two smaller cones inside. The diameter of the cones is smaller on one end than on the other end. The cable is put through the smaller-diameter end, and strands of wire are separated and evenly spaced in the rope socket. The inner cones are pressed into the outer housing to form a mechanical support that is stronger than the cable. Before connecting the rope socket, the rope socket housing is slid onto both ends of the severed cable. On the downhole end of the cable, the rope socket is built and supports to the socket housing. On the uphole end of the severed cable attach the engaging overshot to the housing assembly then to the swivel and finally to the cable overshot. The cable overshot easily latches and unlatches from the cable spearhead. This allows for threading the cable through drill pipe. The swivel keeps the cable from twisting. For the downhole end of the cable, attach the spearhead to the rope socket housing. It is recommended that a circular spearhead should be replaced with a hex spearhead as soon as possible. The hex spearhead will catch on the "no go" in the tool overshot in the event the cable were to fall down the wellbore. After assembling the rope socket and connecting the cable, it is necessary to test the rope sockets using tension to insure the reliability of the rope socket. To test the rope socket, the cable overshot 15 is latched to the spear 14 while the T-Bar 1 is still on the cable. Markings are placed on the cable adjacent to each rope socket with a wrap of tape. These markings indicate any slippage in the cable. Tension is applied to the cable by pulling the cable until a desired or maximum tension is achieved. The maximum tension is the least of a 75 percent of the value of the weak point plus the normal weight of the cable or half the maximum cable strength. A tool weak point is a steel shaft inserted into the connecting head designed to break when a predetermined range of tension is exerted on the shaft. After approximately one minute under the tension, the cable is examined to determine if the cable has slipped in either rope socket by checking for movement of the tape marks. Movement in either direction beyond the marks indicates that the rope socket is not reliable for the fishing procedure.

Once it is determined that the reconnected cable can withstand a desired tension, the next step in the fishing procedure is to deploy the engaging overshot 16 into the well bore. This step consists of lowering the engaging overshot in the wellbore by adding stands of drill pipe end to end in series at the surface and lowering the drill pipe into the well bore. Each pipe joint is approximately 30 feet (9.15 meters) in length and a stand of pipe is typically 3 pipe joints in length. The particular techniques used to attach the pipe stands are known in the industry and therefore are not covered in this description.

As stated previously, conventional fishing operations only reconnect the cable mechanically. The electrical conductors in the cable are not reconnected thereby preventing the logging operations from continuing during the fishing operations. The present invention re-establishes electrical communication between the logging tool and surface recording equipment thereby enabling logging operations to continue if desired during the fishing procedures.

This reconnection technique typically uses a side-door sub device 30 to facilitate the reconnection procedure. Since the tool is stationary and the drill pipe approaches the tool, the recounection point of the cable to remains at the surface. This side-door sub 30 is a tubular device with a cylindrical shape, and has an opening on one side. The side opening allows the cable to exit the string of drill pipe, thereby permitting the drill string stands to be added or removed without having to disconnect (unlatch and latch) the cable. Since this side-door sub 30 is incorporated into and becomes part of the drill pipe string in the well bore, it is necessary to determine the point (depth) at which to insert the side-door sub 30 into the pipe string. This depth is determined in a manner similar to the procedures used in tough logging conditions (TLC). In general, this sub is placed such that it never leaves the wellbore casing and covers the zone of interest of the formation. For example, if the tool where stuck at 10,000 feet (3,048 meters) and the casing went to 8,000 feet (2,438.4 meters), then the side-door sub 30 should be placed on the pipe string when the drill pipe depth is 2,000 feet (609.6 meters) from the stuck logging tool (fish) plus approximately 100 feet (30.48 meters) to insure that the sub always remains in casing. This example requires placing the sub on the pipe string when the string is approximately 7,900 feet (2,407.92 meters) deep. In those cases where there is more open hole than cased hole, it would be necessary to determine the zone of greatest interest and place the sub accordingly in the pipe string. At the desired installation point, the crew installs the side-door similar to any other stand of pipe.

Just before the installation of the side door sub 30, the cable is pulled until the cable tension reaches 2,000 pounds above the normal cable tension. Next T-Bar 11 is placed on the cable line using the earlier described manner. Now slack off enough cable to allow the T-Bar to be supported by the drill pipe. Next the T-Bar is checked for slippage, if any exists repeat the T-Bar installation step and check again. After the installation of the T-Bar, the initially installed spear 14 and overshot 15 are removed thereby disconnecting the previously re-attached cable. Then slide the down hole end of the cable through the side door sub. Rope sockets are rebuilt on both ends of the cable leaving 10 to 15 inches of electrical conductor on each line to allow attachment of boots and pins for re-establishing electrical lines. Build the rope socket for one end of the cable using pins and the other rope socket using boots. When using a top entry side door first place the sub then connect the T-Bar and follow the aforementioned steps.

Figure 3A:
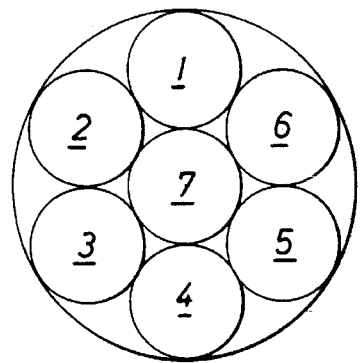
FIG. 3A is a cross-section of the cable showing the electrical conductors.

Since the well logging cable in this preferred embodiment contains 7 wire conductors, the next step is to identify conductor lines 1 through 7 on the uphole end of the cable. FIG. 3A shows the seven conductors of the cable identified as lines 1 through 7. As shown in FIG. 3A, lines 2 and 5, lines 3 and 6 and lines 1 and 4 are opposite each other. The uphole line identification can be done by connecting each line to ground and looking for continuity in that particular line. The downhole end of the cable will require the identification of lines 1 and 4. The identification of lines 1 and 4 is possible with digital tools by using a Simpson ohmmeter and looking for:

2 ohms/100(feet)×the total downhole cable length across opposite wires

Further selection can be verified by isolated lines (lines with infinite resistance) adjacent to wires 1 and 4. Lines 2 and 5 or lines 3 and 6 will have continuity across one adjacent wire.

Figure 3B:
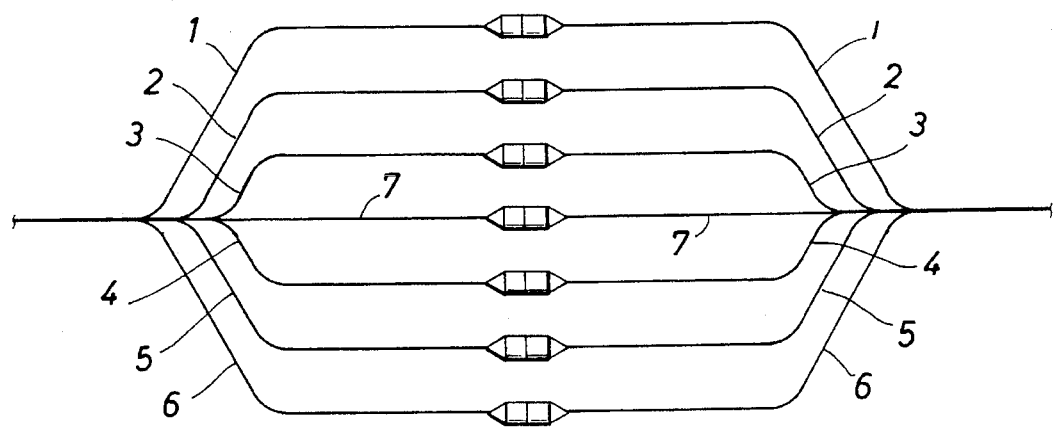
FIG. 3B is an illustration of the connections of the uphole and downhole electrical conductors.
Figure 3C:
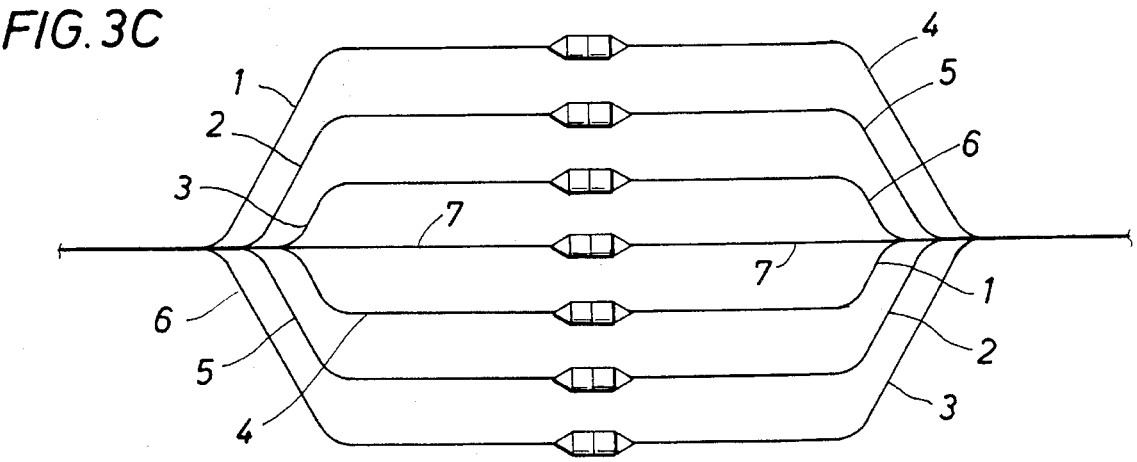
FIG. 3C is an illustration of the connections of the uphole and downhole electrical conductors.

Now there are two ways to connect the cable conductors of the uphole and downhole cable ends which are the following configurations as shown in FIG. 3B and FIG. 3C.

1) lines 1 to 1, 2 to 2, 3 to 3, 4 to 4, 5 to 5, 6 to 6 and 7 to 7; or 2) lines 1 to 4, 2 to 5, 3 to 6, 7 to 7, 4 to 1, 5 to 2, and 6 to 3.

Note that line 7 is always connected to line 7. However, regardless of whether wire I is reconnected to wires 1 or 4 both the Cable Telemetry System (CTS) and the Digital Telemetry System (DTS) will work after being reconnected. As previously stated various tools will have different wiring configurations, therefore it is important to know the responses of various tools. Similarly, for analog tool strings it would be necessary to identify lines for reconnection. If a geophone is run in a core gun it will be possible to identify lines 5 to 7 by probing for (2×cable length/100+resistivity of the geophone). When running a Dual Induction Tool—D (DITD) it will be possible to identify wire pair 1 and 4 by locating the transformer; however, since analog tools use a specific line for a specific function crossing lines 1 and 4 would make the tool inoperable. DITD lines can be further identified by locating the relay on line 5 (cable length/100+ resistivity of the relay). When reconnecting lines there is a danger of crossing lines which could damage the downhole tools. For digital tools damage will only come from crossing tool power lines 1 and 4 to telemetry lines 2, 3, 5, or 6. Analog tools can be damaged much easier depending on the tool types. For example, the Formation Density—C (FDC) logging tool uses lines 1 and 4 for power, 2 to open the caliper and 6 to close the caliper. If any of these lines where connected to lines 3 or 5, the tool could be damaged. The connected rope sockets are placed in a double-ended torpedo device as shown in FIG. 4A. The torpedo device 31 supplies mechanical support for and houses electrical conductors. The torpedo is comprised of two hollow shells 32 and 33, as shown in FIG. 4B, that are clamped and held together by two complete rings 34 and 35 at the top and bottom of the half shells. These rings fit over the stems of the torpedo shells. In side the two half shells are the electrically connected conductors 1 through 7. These conductors are attached through rope sockets 36 and 37. As previously described, a conventional rope socket device is a hollow cylinder containing two smaller cones inside. The diameter of the cones is smaller on one end than on the other end. The cable is put through the smaller-diameter end, and strands of wire are separated and evenly spaced in the rope socket. The inner cones are pressed into the outer housing to form a mechanical support that is stronger than the cable. At this point, since the electrical communication has been re-established, the capability of powering up the tool string is now restored. The torpedo is checked for slippage by placing tape on both ends of the torpedo then adding tension to the cable by pulling the cable the maximum allowable tension.

After checking torpedo slippage, the tension in the cable is increased to approximately 2,000 pounds over the normal tension. When using a top entry side door sub, the T-Bar and side door sub entrance panel are removed and the cable is pulled through the side door opening. The side door cover is re-connected after the cable has been pulled through the side door opening. When using a standard TLC side entry sub, the T-Bar is removed and the sub is screwed into the drill string. This step will generally be done using a sub with right hand threading on top and left hand threading on bottom. This will prevent the cable from twisting around drill pipe during the connection process. Next the driller should proceed downhole continuing to lower the overshot sub until it encounters the stuck tool. Also, tension/torpedo position is monitored to insure that the cable does not hang up on the drill pipe.

FIG. 5 shows the logging tool engaged by the overshot sub. Notice the flushed end of the engaging overshot 16 fits easily over the logging tool, thereby making it easier to dislodge the tool. There are two methods used to engage the fish. One involves slowly turning the mud pumps and monitoring the mud pressure for an increase in pressure. The second method requires careful monitoring of both cable tension and drill pipe pressure. This invention also has the advantage of being able to monitor tool head tension (this is not possible without electrical connections). The tension in the cable is maintained at 2,000 pounds above the normal tension on the cable. As the cable tension increases, the fish (stuck tool) is being pulled into the overshot sub. A reduction in cable tension should occur as the drill string is raised if the tool is properly engaged. If the drill pipe and cable tension continue to increase when the pipe is inserted in the well bore this indicates that the tool is engaged. Next, pull the tool into the overshot sub. The operator should pull the cable as much as possible without increasing the tension to more than half the maximum strength of the cable or 75% of the cable weak point. This procedure of engaging the fish is repeated until crew operators are satisfied that they have engaged the tool.

At this point, the fishing system is set up in a manner similar to fishing systems used in tough logging conditions (TLC). However, unlike conventional fishing systems, the present system can at this point perform well logging functions. The operator can lower the retrieved tool and continue the well logging process or bring the tool to the surface. As the tool is brought to the surface, formation logging procedure can resume until the side-door sub 30 reaches the surface.

If logging operations are to continue at deeper wellbore depths, insure that the double-ended torpedo 31 is water proofed with tight seals and DC-3 (a silicon displacement fluid—non-conductive to insure that mud does not short out tool) packing. A winch man should keep constant tension on the line. If necessary, the snatch block 11 should be adjusted to keep it out of the drill crew's area. If it is desired to extend the tool deeper into the wellbore, for instance to overlap the log run, it may be necessary to remove the snatch block and reconnect the cable above the torpedo.

If the desire is to retrieve the tool and bring it uphole, any calipers should be opened and the uphole retrieval procedure begins. During the uphole retrieval, particular attention is paid to the snatch block to move it under the torpedo. When appropriate the snatch block can be reconnected below the torpedo. When logging during the uphole retrieval, the wellbore is logged one pipe stand at a time. As each stand reaches the surface, it is removed from the pipe string in a conventional manner. (Note: The earlier installation of the side-door sub 30 makes this possible; otherwise, the wireline would be threaded through drill pipe and this retrieval method would not be possible.) During this procedure it is imperative that constant tension is applied to the cable. This is important since cable movement is used for depth control. Thus variable tension leads to variable depth.

As the retrieval process continues and the side-door sub reaches the surface, the side-door plate is removed. Next, the snatch block is removed allowing the cable to hang free inside the drill pipe. A T-Bar is attached to the cable and placed in the elevators. The driller should pull out of the weak point and disconnect the T-Bar. Next the cable is spooled up, being careful to stop in time to prevent the cable from going over the upper sheave. Cut the cable at the lower sheave and duct tape equal lengths of cable together. After the cable is severed and secured, the side-door sub is removed. At this point, the remaining pipe stands are removed until the once stuck tool is retrieved at the surface.

The method and system of the present invention provides a significant advantage over the prior art. The invention has been described in connection with the preferred embodiments. However, the invention is not limited thereto. Changes, variations and modifications to the basic design may be made without departing from the inventive concept in this invention. In addition, these changes, variations modifications would be obvious to those skilled in the art having the benefit of the foregoing teachings contained in this application. All such changes, variations and modifications are intended to be within the scope of the invention which is limited by the following claims.

I claim:

1. A method of logging an earth formation with a logging tool while fishing said logging tool from a well bore traversing said earth formation, said tool being stuck in said well bore and being in communication with surface logging equipment through a wireline, said method comprising the steps of:
    a) severing said wireline connecting the logging tool to surface logging equipment in order to install fishing equipment that will travel downhole, via drill pipe said fishing equipment will engage the stuck logging tool;
    b) re-connecting the severed wireline such that electrical communication is re-established between said stuck logging tool and surface logging equipment;
    c) engaging and dislodging said stuck logging tool with said fishing equipment; and
    d) logging said earth formation with said logging tool while fishing said logging tool from said earth formation.

2. The method of claim 1 further comprising before said severing step the step of securing said wireline to prevent said wireline, once severed, from falling into said well bore.

3. The method of claim 1 wherein after said electrical reconnection step, the severed wireline is mechanically reconnected.

4. The method of claim 3 further comprising before said reconnecting step the step of attaching a latching device to each end of said severed wireline to provide for the mechanical connection of said wireline.

5. The method of claim 4 further comprising testing said latching device to insure said latching is reliable under the tension of the fishing procedure.

6. The method of claim 1 further comprising, before said electrical reconnecting step, the step of determining the depth at which to lower said fishing equipment before electrically reconnecting said wireline.

7. The method of claim 1 wherein said electrical communication of said wireline is re-established by connecting said wireline conductors from each severed wireline such that conductors are paired 1 to 1, 2 to 2, 3 to 3, 4 to 4, 5 to 5, 6 to 6 and 7 to 7.

8. The method of claim 1 wherein said electrical communication of said wireline is re-established by connecting said wireline conductors from each severed wireline such that said conductors are paired 1 to 4, 2 to 5, 3 to 6, 4 to 1, 5 to 2, 6 to 3 and 7 to 7.

9. The method of claim 1 further comprising, after step (b), the step of lowering the fishing equipment in said well bore until said equipment engages said stuck logging tool.

10. The method of claim 1 wherein said fishing equipment engages stuck logging tool by slowly turning mud pumps and monitoring drill pipe pressure for increases.

11. The method of claim 1 further comprising before step (d) the step of determining when said fishing equipment engages said stuck logging tool by monitoring tension in the cable and drill pipe pressure.

12. A well logging system for logging an earth formation with a logging tool, said tool being stuck in a well bore traversing said earth formation, while fishing said logging tool from a well bore comprising;
    a) an engaging means for engaging and dislodging said stuck logging tool, said engaging means being adapted for movement through said well bore;
    b) a communication means for providing electrical communication between said logging and surface logging equipment and thereby enabling transmission of electronic data from said logging tool to said surface logging equipment; and
    c) a protection means attached to said communication means for protecting and maintaining electrical connections in said communication means.

13. The well logging system of claim 12 wherein said engaging means has upper and lower portions, said lower portion having a flared shape and engages the stuck tool and said upper portion having a cylindrical shape.

14. The well logging system of claim 13 wherein said engaging means further comprises an extension means for extending said engaging means in said well bore, said extension means being of a cylindrical shape and attached to said upper portion of said engaging means such that said extension means extends out of and above the well bore and formation surface.

15. The well logging system of claim 14 wherein said extension means has an opening on its side, said opening located approximately at the earth formation surface.

16. The system of claim 12 wherein said communication means provides conductors to carry electrical signals, said means also being attached to said logging tool and said surface logging equipment.

17. The system of claim 12 wherein said protection means is a torpedo device.

18. The system of claim 17 wherein said torpedo device comprises:
    a) a pair of hollow shelves; and
    b) a pair of rings attached at each end of the hollow shelves that clamp the pair of shelves such that the electrical connections are contained in the shelves.

19. A well logging system for logging an earth formation with a logging tool, said tool being stuck in a well bore traversing said earth formation, while fishing said logging tool from a well bore comprising:
    a) an overshot for engaging and dislodging said stuck tool;
    b) drill pipe attached to said overshot for extending said overshot into said well bore, said drill pipe having a side opening at some point in the drill string to allow cable to pass through drill pipes; and c) a cable extending through said drill pipe opening and attaching said logging tool to said surface logging equipment, said cable containing electrical conductors for transporting signals from said logging tool to said surface equipment.

* * * * *